United States Patent
Fatehi et al.

[11] Patent Number: 5,930,013
[45] Date of Patent: Jul. 27, 1999

[54] OPTICAL SWITCHED SELECTOR

[75] Inventors: Mohammad T. Fatehi, Middletown; Wayne Harvey Knox, Rumson, both of N.J.

[73] Assignee: Lucent Technologies Inc., Murray Hill, N.J.

[21] Appl. No.: 08/777,891

[22] Filed: Dec. 31, 1996

[51] Int. Cl.⁶ ...................................................... H04J 14/00
[52] U.S. Cl. ........................ 359/117; 359/134; 359/160; 359/187
[58] Field of Search ................... 359/117, 134, 359/160, 187

[56] References Cited

U.S. PATENT DOCUMENTS

| | | | |
|---|---|---|---|
| 5,181,134 | 1/1993 | Fatehi et al. | 359/117 |
| 5,491,581 | 2/1996 | Roba | 359/341 |
| 5,633,961 | 5/1997 | Kirkby et al. | 385/16 |
| 5,742,416 | 4/1998 | Mizrahi | 359/134 |
| 5,745,274 | 4/1998 | Fatehi et al. | 359/187 |

FOREIGN PATENT DOCUMENTS

| | | | |
|---|---|---|---|
| 582 406 | 2/1994 | European Pat. Off. | 359/160 |
| 9929 | 1/1992 | Japan | 359/117 |

*Primary Examiner*—Thomas Mullen
*Attorney, Agent, or Firm*—Gregory J. Murgia

[57] ABSTRACT

A gain-switched optical selector is realized by employing an optical rare earth-doped fiber optical amplifier as the switching element per se. Each of the optical rare earth-doped optical amplifiers acts as an ON/OFF switch. Also, the gain-switched optical selector of this invention is a natural fit into today's optically amplified optical communication systems. In one embodiment, this is realized by employing a pump select circuit in conjunction with a plurality of pumps and a plurality of corresponding rare earth-doped fiber optical amplifiers. The particular pump and corresponding optical amplifier are selected by use of a monitor arrangement to determine which signal is to be selected and routed to an output. In another embodiment, a so-called tuned pump arrangement is employed in conjunction with a plurality of filters and a corresponding plurality of rare earth-doped fiber optical amplifiers. A pump tuning arrangement is employed to control the tunable pump in order to select the appropriate one of a plurality of optical input signals at any of a plurality of given wavelengths.

4 Claims, 3 Drawing Sheets

OPTICAL SWITCHED SELECTOR

RELATED APPLICATIONS

U.S. patent applications Ser. No. 08/777,894, now U.S. Pat. No. 5,815,613 (M. T. Fatehi-W. H. Knox Case 15-20), Ser. No. 08/777,890 (allowed Jul. 20, 1998)(M. T. Fatehi-W. H. Knox Case 12-17), and Ser. No. 08/777,892 (allowed Oct. 9, 1998) (M. T. Fatehi-W. H. Knox Case 18-23) were filed concurrently herewith.

TECHNICAL FIELD

This invention relates to optical communication elements and, more specifically, to optical selector switches.

BACKGROUND

An electrical N×1 selector switch is an N×1 switching device which routes any one of the N input lines to the single output port, as shown in FIG. 1. An optical N×1 selector switch is the optical analog of the electrical N×1 selector switch where the input and output ports are optical fibers carrying one or more optical communication signals at different wavelengths. Certain selector switches may permit selection of more than one input port and adding (under certain rules) the signals from the selected ports. This properly is called the collection capability of the selector switch.

Prior known selectors employed mechanical switching elements. Such prior arrangements employing mechanical selectors were limited in selecting only one line at a time, their speed was slow, and their reliability was less than desirable. One such arrangement is shown in FIG. 1 where a plurality of incoming optical lines 100-1 through 100-N which are supplied to the selector 101 and switching element 103. Switching element 103, under control of actuator 102, then would select one of the optical lines 100 to be supplied to output optical line 104.

A number of electro-mechanical optical selector switches are presently available. These devices are based on mechanically moving the input and/or output fibers or utilizing various reflective or deflective optical elements to align beams of light out of the input fibers and routing them to the output fiber. Clearly, these mechanical switches are slow and, in most cases, do not permit collection capability, a desirable feature in communication systems. In some cases, the optical loss associated with these elements is significant.

Solid state wave-guide selector switches based on lithium niobate (see for example U.S. Pat. No. 5,181,134) or indium phosphide optical switching devices are also available which solve the speed problems. The drawback involved with these optical switching devices include polarization dependence and significant optical losses. The large optical insertion losses connected with these devices soon become intolerable when such devices are concatenated.

SUMMARY OF THE INVENTION

The problems and limitations of the prior known mechanical selectors and various solid state optical selectors are overcome, in one embodiment of the invention, by employing an optical rare earth-doped fiber optical amplifier as the switching element per se of a gain-switched optical selector. Each of the optical rare earth-doped fiber optical amplifiers acts as an ON/OFF switch. Also, the gain-switched optical selector of this invention is a natural fit into today's optically amplified optical communication systems. In one embodiment, this is realized by employing a pump select circuit in conjunction with a plurality of pumps and a plurality of corresponding rare earth-doped fiber optical amplifiers. The particular pump and corresponding optical amplifier are selected by use of a monitor arrangement to determine which signal is to be selected and routed to an output. In another embodiment, a so-called tuned pump arrangement is employed in conjunction with a plurality of filters and a corresponding plurality of rare earth-doped fiber optical amplifiers. A pump tuning arrangement is employed to control the tunable pump in order to select the appropriate one of a plurality of optical input signals at any of a plurality of given wavelengths.

DETAILED DESCRIPTION

Figure 1:
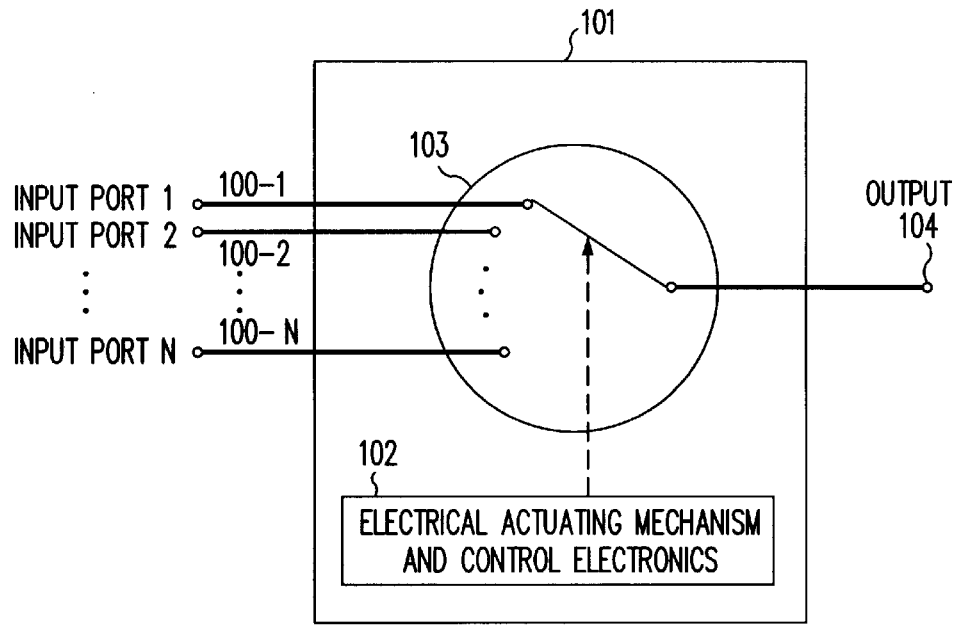
FIG. 1 is a prior art electro-mechanical selector arrangement.
Figure 2:
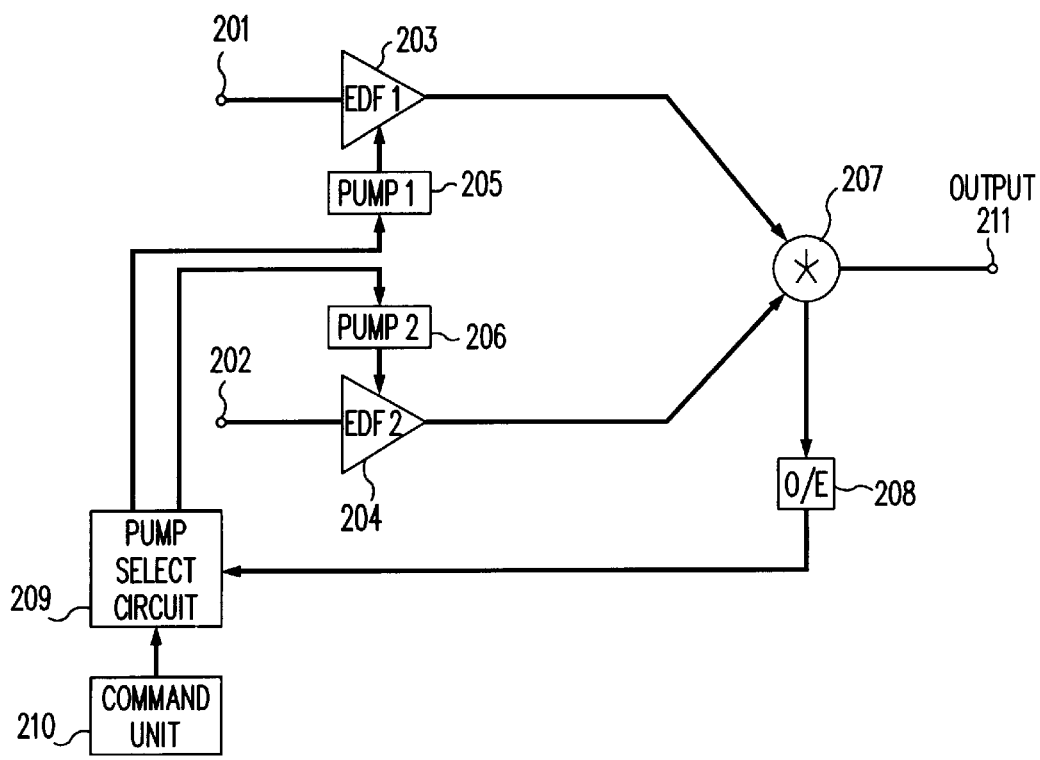
FIG. 2 illustrates one embodiment of the invention employing so-called switched pumps with rare earth-doped optical fiber amplifiers.

FIG. 2 shows, in simplified form, an embodiment of the invention including optical fiber lines 201 and 202 which supply optical signals at predetermined wavelengths or sets of wavelengths to rare earth-doped fiber optical amplifier (herein after "amplifier") 203 and amplifier 204, respectively. The rare earth doped optical fiber can be, for example, a length of erbium doped fiber coupled to a wavelength selective coupler, for example, a wavelength division multiplexed coupler, through which a pump is coupled thereto. Further note that loss is equalized by the length of the rare earth-doped fiber and gain is equalized by the pump power. As shown, pump 205 is coupled to amplifier 203, and pump 206 is coupled to amplifier 204. As is known in the art, each of pumps 205 and 206 respectively powers amplifiers 203 and 204. Additionally, it is known, the pumping can be co-directional or counter directional. Indeed, the pumping could also be bi-directional The outputs of the amplifiers 203 and 204 are combined by an optical star-coupler (herein after "coupler") 207, in well-known fashion. The coupler 207, for a two-optical line arrangement, is known as a 3dB coupler. The primary output of the coupler 207 is supplied to output optical fiber 211, which may be connected to a receiver or to a long distant transport fiber. The secondary output of coupler 207 is supplied to an optical to electrical converter (O/E) 208, which monitors the power level of the selected line and determines the parameters and ID (identification) tags associated with selected lines (see for example, co-pending U.S. patent application Ser. No. 08/579529, filed Dec. 27, 1995) now U.S. Pat. No. 5,745,274. The information from O/E 208 is supplied to pump selector 209, which then selects either pump 205 or pump 206, in accordance with desired parameters. It should be noted, however, that other optical coupling arrangements known in the art may be equally employed in place of coupler 207. This will be apparent to those skilled in the art. It should be noted that the secondary output from coupler 207 which is supplied to O/E 208 is optional and this embodiment of the invention may be utilized without it. The output from O/E 208 is supplied to pump select circuit 209, where it is employed to further refine the pump selection process. Specifically, in this example, O/E 208 monitors the power level of the selected signal and determines the parameters and ID tags associated with the selected line(s) being supplied to coupler 207. Also supplied to pump select circuit 209 are command and control information from command and control unit 210, which is utilized with information from other network elements in an optical system in order to select which of pumps 205 or 206 is to be selected and, accordingly, which of amplifiers 203 or 204 will be supplying an optical signal via coupler 207 to output optical fiber 211 as an output. It should be noted, however, that although we have shown the use of O/E 208, in this example, that other arrangements may be employed to monitor different parameters in order to select which of pumps 205 and 206 and, accordingly, which of amplifiers 203 and 204 will be supplying the output.

Figure 3:
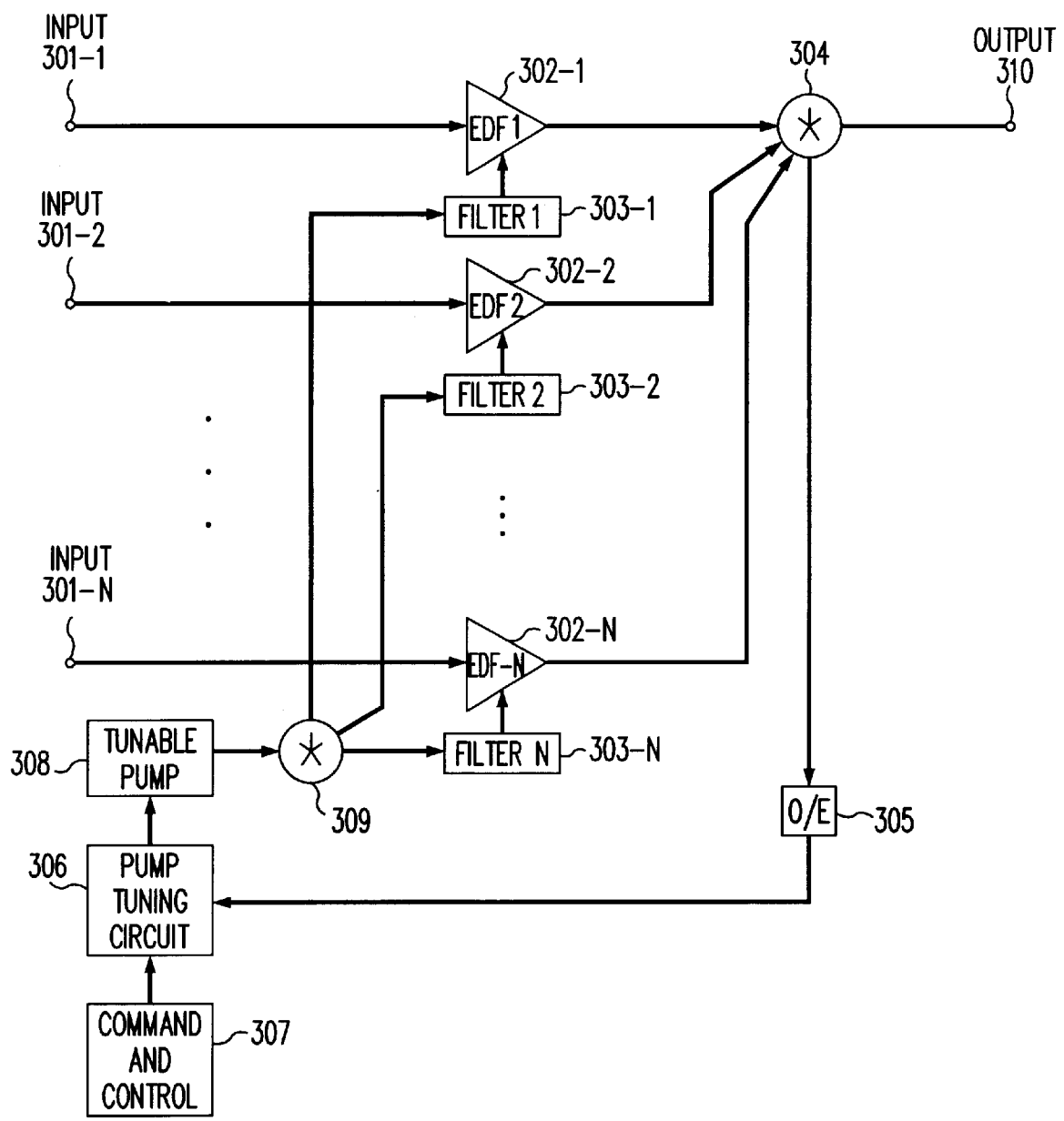
FIG. 3 shows a tuned-pump arrangement including rare earth-doped fiber optical amplifiers.

FIG. 3 shows in simplified form another embodiment of the invention for a plurality of optical fiber lines 301-1 through 301-N and a corresponding plurality of amplifiers 302-1 through 302-N. In this embodiment of the invention, only one tunable pump 308 is employed, which is coupled to each of filters 303-1 through 303-N through optical star coupler (herein after "coupler") 309, which gives us the technical advantage of cost savings. The plurality of filters 303-1 through 303-N are associated on a one-to-one basis with amplifiers 302-1 through 302-N, respectively. Again, the outputs of amplifiers 302-1 through 302-N are supplied to optical star coupler (herein after "coupler") 304. The primary output of coupler 304 provides the system output and is supplied to output optical fiber 310, which may be connected to a receiver or to a long distant transport fiber. The secondary output of coupler 304 is supplied to a power monitor unit 305, which monitors the power level of the selected line and determines the parameters and ID (identification) tags associated with selected lines (see for example, co-pending U.S. patent application Ser. No. 08/579529, now U.S. Pat. No. 5,745,274 noted above). The information from O/E 305 is supplied to pump tuning circuit 306, which then selects one of filters 303-1 through 303-N, in accordance with desired parameters. It should be noted, however, that other optical coupling arrangements known in the art may be equally employed in place of coupler 304. It should be noted, however, that although we have shown the use of O/E 305, in this example, that other arrangements may be employed to monitor different parameters in order to adjust pump tuning circuit 306 and, hence, tunable pump 308 and, accordingly, which of amplifiers 302-1 through 302-N will be supplying the output. This will be apparent to those skilled in the art. It should be noted that this secondary output from coupler 304 which is supplied to O/E 305 is optional and this embodiment of the invention may be utilized without it. The output from O/E 305 is supplied to pump tuning circuit 306, where it is employed to further refine the pump selection process. Specifically, in this example, O/E 305 monitors the power level of the selected signal and determines the parameters and ID tags associated with the selected line(s) being supplied to coupler 304. Also supplied to pump tuning circuit 306 are command and control information from command and control unit 307, which is utilized with information from other network elements in an optical system in order to select which wavelength is to be selected and, accordingly, which of amplifiers 302-1 through 302-N will be supplying an optical signal via coupler 304 to output optical fiber 310 as an output. The output from tunable pump 308 is supplied via coupler 309 to filters 303-1 through 303-N which, in turn, select the appropriate one of amplifiers 302-1 through 302-N to supply an output to coupler 304.

Figure 4:
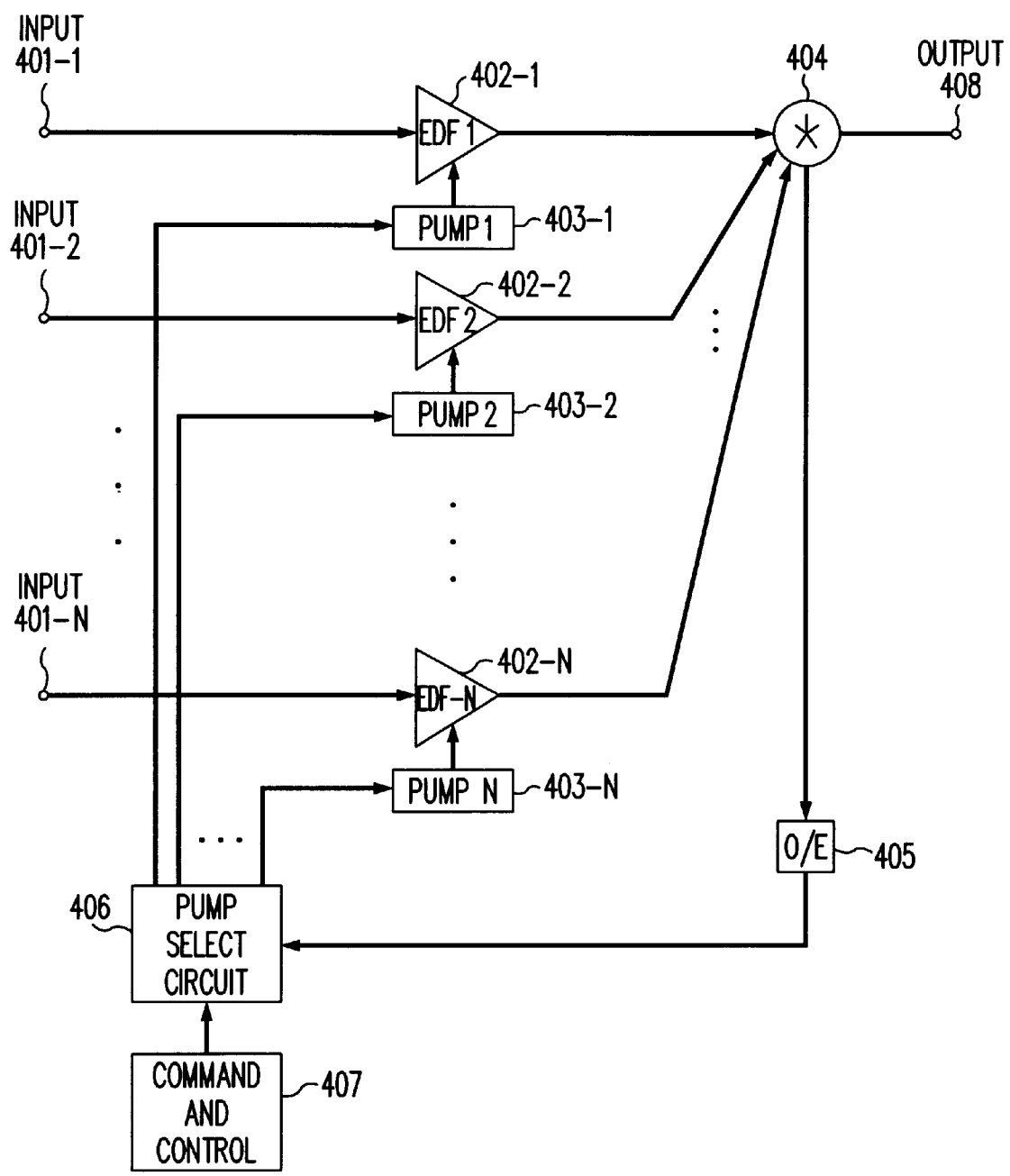
FIG. 4 shows a switched-pump arrangement including a plurality of pumps and corresponding rare earth-doped fiber amplifiers.

FIG. 4 shows in simplified block diagram form, another embodiment of the invention employing a plurality of optical fiber lines 401-1 through 401-N and a corresponding plurality of rare earth doped optical fiber amplifiers (herein after "amplifiers") 402-1 through 402-N. In this embodiment of the invention, a corresponding plurality of pumps 403-1 through 403-N are associated with amplifiers 402-1 through 402-N, respectively. The optical outputs from amplifiers 402-1 through 402-N, in this example, are supplied to an optical star-coupler (herein after "coupler") 404. It should be noted, however, that other optical coupling arrangements known in the art may be equally employed in place of coupler 404. This will be apparent to those skilled in the art. A primary output of star-coupler 404 is supplied to an output of optical fiber 408, while a secondary output from coupler 404, in this example, is supplied to optical to electrical converter (O/E) 405. It should be noted that this secondary output from coupler 404 is optional and this embodiment of the invention may be utilized without it. The output from O/E 405 is supplied to pump select circuit 406 where it is employed to further refine the pump selection process. Specifically, in this example, O/E 405 monitors the power level of the selected signal and determines the parameters and ID tags associated with the selected line(s) being supplied to coupler 404. Also supplied to pump select circuit 406 are command and control information from command and control unit 407 is utilized with information from other network elements in an optical system in order to select which of pumps 403 are to be selected and, accordingly, which of amplifiers 402 will be supplying an optical signal via coupler 404 to output optical fiber 408 as an output.

What is claimed is:

1. An optical selector having a plurality of inputs and an output comprising:

a plurality of optical amplifiers corresponding to the plurality of inputs, each employed as a switching element, wherein each of the optical amplifiers comprises an optical rare earth-doped fiber having a predetermined length and a corresponding filter;

a coupling element for coupling an outgoing optical signal from each of the plurality of optical amplifiers;

a pump arrangement responsive to a command signal for controlling ON/OFF states of each of said plurality of optical amplifiers so that one or more of the incoming optical signals is supplied to the output, the pump arrangement including a tunable pump and a pump tuning circuit and a coupler for coupling an output from the tunable pump to each of the filters corresponding to the plurality of optical amplifiers, the pump tuning circuit being responsive to command and control signals for controlling the tunable pump to supply pumping signals for turning ON/OFF one or more of the plurality of optical amplifiers, the filters filtering the pump signal to effect the turning ON/OFF of the one or more of the plurality of optical amplifiers.

2. The optical selector of claim 1 wherein the fiber is doped with erbium.

3. The optical selector of claim 1 wherein the pump arrangement associated with the rare earth-doped fiber is arranged to provide co-directional pumping of the rare earth-doped fiber optical amplifier.

4. The optical selector of claim 1 wherein the pump arrangement associated with the rare earth-doped fiber is arranged to provide counter directional pumping of the rare earth-doped fiber optical amplifier.

* * * * *